United States Patent
Satou et al.

[19]

[11] Patent Number: 5,953,174
[45] Date of Patent: Sep. 14, 1999

[54] MAGNETIC TAPE DRIVE UNIT HAVING REDUCED POWER CONSUMPTION

[75] Inventors: Jun-ichi Satou; Akihiro Yamazaki, both of Kawasaki, Japan

[73] Assignee: Fujitsu Limited, Kawasaki, Japan

[21] Appl. No.: 08/910,772

[22] Filed: Aug. 13, 1997

Related U.S. Application Data

[63] Continuation of application No. 08/493,110, Jun. 20, 1995, abandoned.

[30] Foreign Application Priority Data

Nov. 17, 1994 [JP] Japan .................................... 6-283732

[51] Int. Cl.$^6$ .................................................. G11B 15/18
[52] U.S. Cl. ............................... 360/69; 360/71; 361/688
[58] Field of Search ............................... 360/69, 71, 74.1, 360/137, 62; 361/687, 688, 690, 694, 695

[56] References Cited

U.S. PATENT DOCUMENTS

| | | | |
|---|---|---|---|
| 4,519,011 | 5/1985 | Bowden | 360/71 X |
| 4,672,509 | 6/1987 | Speraw | 361/384 |
| 4,685,303 | 8/1987 | Branc et al. | 360/69 X |
| 4,737,867 | 4/1988 | Ishikawa et al. | 360/62 X |
| 5,313,344 | 5/1994 | Sakaguchi et al. | 360/69 X |

FOREIGN PATENT DOCUMENTS

| | | |
|---|---|---|
| 1-258263 | 10/1989 | Japan . |
| 2-210684 | 8/1990 | Japan . |
| 3-186073 | 8/1991 | Japan . |

*Primary Examiner*—Andrew L. Sniezek
*Attorney, Agent, or Firm*—Greer, Burns & Crain

[57] ABSTRACT

Disclosed herein is a magnetic tape drive unit including a write circuit for writing data onto a magnetic tape, a read circuit for reading data written on the magnetic tape, a cartridge load circuit for controlling a load operation that a magnetic tape cartridge put into the drive unit is moved to a position where a hub of the cartridge is rotatable, and also controlling an unload operation reverse to the load operation, and a tape thread circuit for controlling a thread operation that the magnetic tape is drawn from the cartridge loaded and is then wound around a machine reel, and also controlling an unthread operation reverse to the thread operation. The magnetic tape drive unit further includes a power supply for supplying power to each circuit. An operating condition of each circuit is monitored and the supply of power from the power supply to each circuit is individually switched on or off by a control circuit, thereby allowing power saving.

10 Claims, 19 Drawing Sheets

FIG.8

Table Area

| Address | Data Area |
|---|---|
| 0 | Write Circuit Operating Condition |
| 1 | Read Circuit Operating Condition |
| 2 | Motor Drive Circuit Operating Condition |
| 3 | Tape Thread Circuit Operating Condition |
| 4 | Cartridge Load Circuit Operating Condition |
| 5 | Cooling Fan Drive Circuit Operating Condition |

MAGNETIC TAPE DRIVE UNIT HAVING REDUCED POWER CONSUMPTION

This application is a continuation Ser. No. 08/493,110 filed on Jun. 20, 1995, now abandoned.

BACKGROUND OF THE INVENTION

1. Field of the Invention

The present invention relates to a magnetic tape drive unit for use as computer peripheral equipment.

2. Description of the Related Art

In association with recent rapid development in the field of computer system including a workstation as the core, it has been increasingly desirable therefor; to reduce the size power consumption a magnetic tape drive unit used as a data backup device for the computer system. At present, there is provided a computer data backup device aiming at size reduction and power saving by using a 8-mm tape or a DAT (Digital Audio Tape) for VTR or audio equipment. Further, also in a magnetic tape drive unit using an standard 3480 magnetic tape cartridge (single reel), size reduction and power saving are desired.

However, the use environment of such a conventional magnetic tape drive unit is intended for medium- and large-sized computer systems, so that a power unit is provided separately from the body of the magnetic tape drive unit to perform power control of the system as a whole. Further, in a magnetic tape drive unit for a small-sized computer system as represented by a 8-mm tape drive unit, the supply of power to a circuit as represented by a read/write circuit is cut off when no command is received after a given period of time, for example, thereby effecting power saving in the drive unit as a whole. In recent years, the development of workstations and personal computers has led to an increase in need of a cartridge type of magnetic tape drive unit for medium-and small-sized computer systems. However, it is pointed out that such a cartridge type of magnetic tape drive unit in the prior art is insufficient in size reduction and power saving in its application to a small-sized computer system.

SUMMARY OF THE INVENTION

It is therefore an object of the present invention to provide a cartridge type of compact magnetic tape drive unit which can reduce power consumption of the drive unit as a whole by maximizing the utilization of a merit owing to installation of a power supply in the drive unit for the purpose of reduction in size (e.g., a merit such that power supply control can be made finer).

In accordance with an aspect of the present invention, there is provided a compact magnetic tape drive unit comprising a write circuit for modulating given data and then writing the data modulated through a magnetic head onto a magnetic tape; a read circuit for reading contents written on the magnetic tape by means of the magnetic head and then demodulating the contents read; a cartridge load circuit for controlling a load operation that a magnetic tape cartridge put into the drive unit is moved to a position where a hub of the magnetic tape cartridge is rotatable, and also controlling an unload operation reverse to the load operation; a tape thread circuit for controlling a thread operation that the magnetic tape is drawn from the magnetic tape cartridge loaded and is then wound around a machine reel, and also controlling an unthread operation reverse to the thread operation; a power supply for supplying power to each of the circuits; power on/off means for switching on or off supply of power from the power supply to each of the circuits individually; and power supply control means for monitoring an operating condition of each of the circuits and controlling the power on/off means according to whether the supply of power to each of the circuits is required or not.

The power on/off means may be so designed as to select some of the circuits consuming a particularly large amount of power (e.g., the write circuit and the read circuit) and switch on or off the supply of power to the selected circuits only.

According to the present invention, the power supply control means monitors the operating condition of each circuit and controls the supply of power from the power supply to each circuit individually according to whether or not it is required. Accordingly, power consumption of the drive unit as a whole can be reduced.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8 is a view illustrating a table area;

DETAILED DESCRIPTION OF THE PREFERRED EMBODIMENTS

A preferred embodiment of the present invention will now be described in detail with reference to the accompanying drawings.

Figure 1:
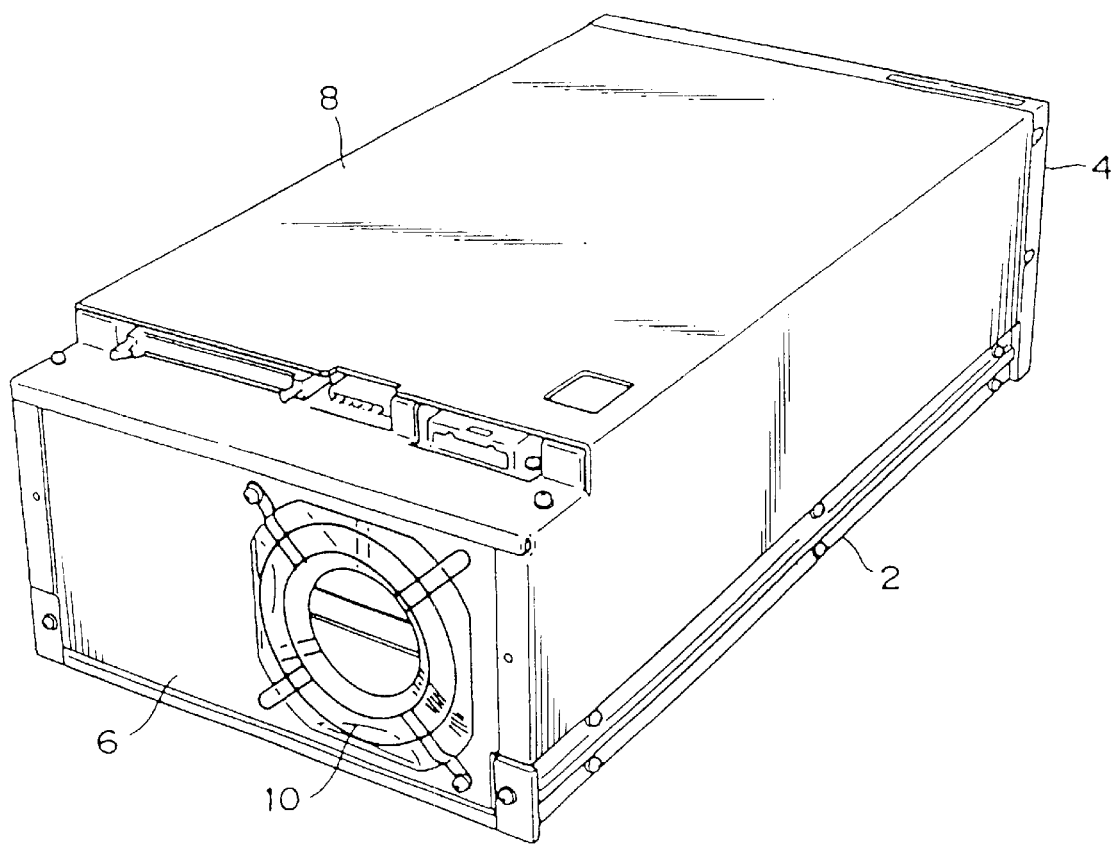
FIG. 1 is a perspective view of a magnetic tape drive unit as viewed from the rear side thereof according to a preferred embodiment of the present invention.

FIG. 1 is a perspective view of a magnetic tape drive unit to which the present invention is applicable, as viewed from the rear side. The magnetic tape drive unit has a housing consisting of a body frame 2, an operator panel 4 fixed to the front end of the body frame 2, an back panel 6 fixed to the rear end of the body frame 2, and a cover 8 removably mounted to these members 2, 4 and 6. The back panel 6 is provided with a cooling fan 10 for ventilating the magnetic tape drive unit.

Figure 2:
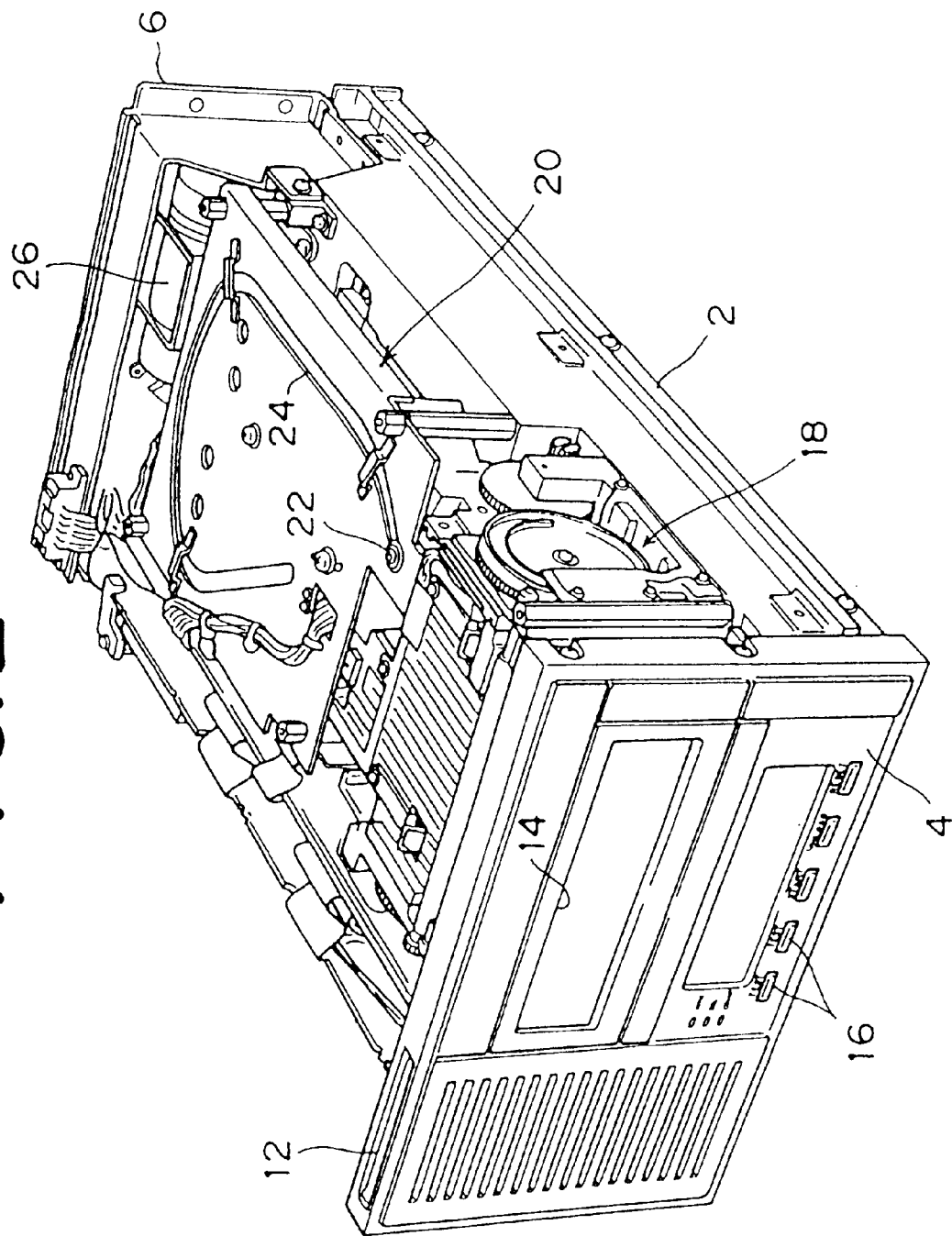
FIG. 2 is a perspective view of the magnetic tape drive unit as viewed from the front side thereof under the condition where a cover is removed.

FIG. 2 is a perspective view of the magnetic tape drive unit as viewed from the front side under the condition where the cover 8 (see FIG. 1) is removed. The operator panel 4 is provided with an air filter 12, a magnetic tape cartridge insert opening 14, and various switches 16. Inside the drive unit, a loader assembly 18 and a threader assembly 20 are provided so as to be arranged in this order from the side of the insert opening 14. The threader assembly 20 has a pin 22 for engaging a leader block of a magnetic tape cartridge to be hereinafter described. The pin 22 is movable along a groove (slit) 24 to guide the leader block. Reference numeral 26 shown between the threader assembly 20 and the back panel 6 denotes an air pump used to avoid the contact of a magnetic head and a magnetic tape. Air from the air pump 26 is supplied between the magnetic head and the magnetic tape.

Figure 3:
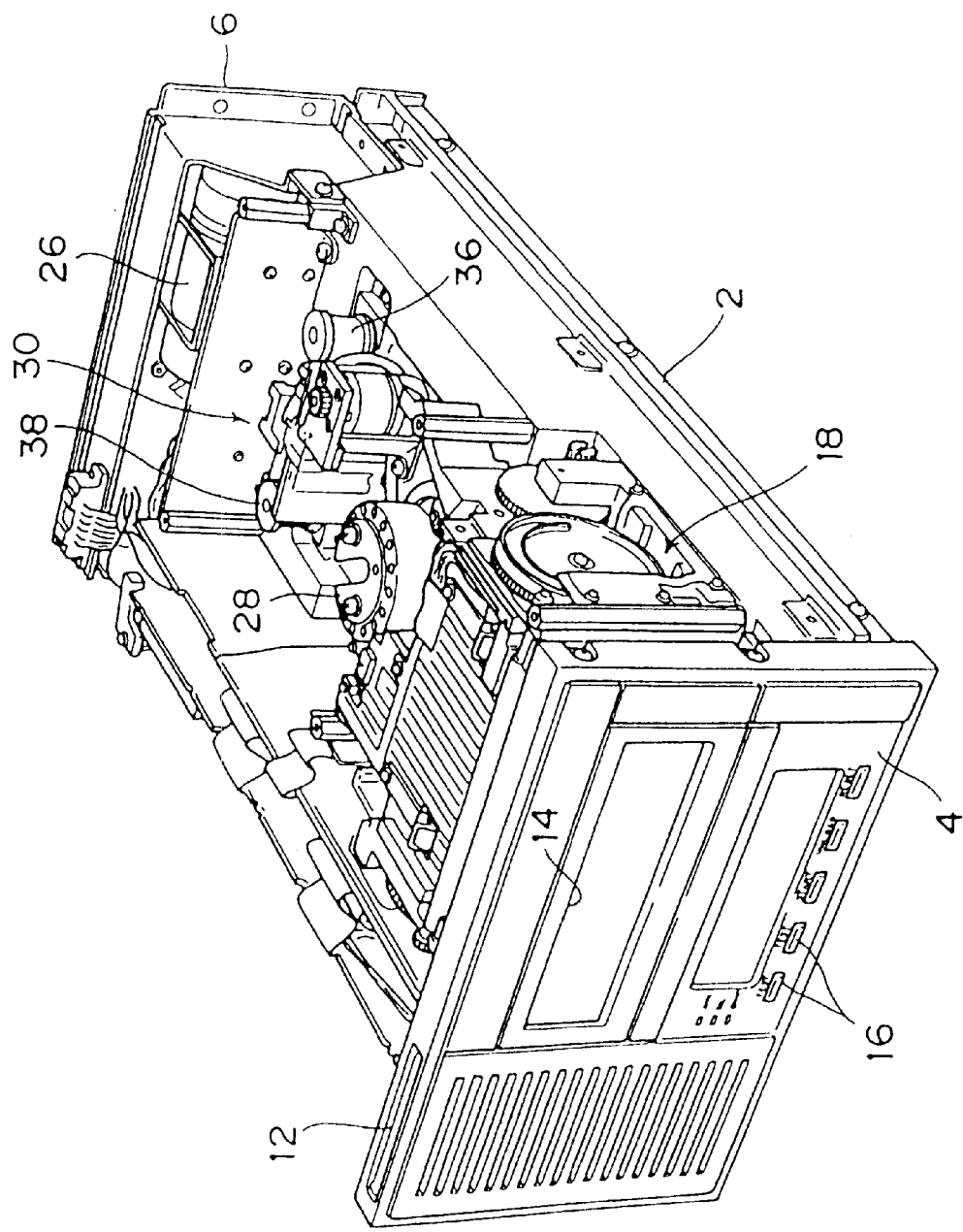
FIG. 3 is a perspective view of the magnetic tape drive unit as viewed from the front side thereof under the condition where a threader assembly is removed.

FIG. 3 is a perspective view of the magnetic tape drive unit as similar to FIG. 2 under the condition where the threader assembly 20 is further removed. Under the threader assembly 20, a machine reel 28 and a head assembly 30 are provided so as to be arranged in this order from the side of the loader assembly 18.

Figure 4:
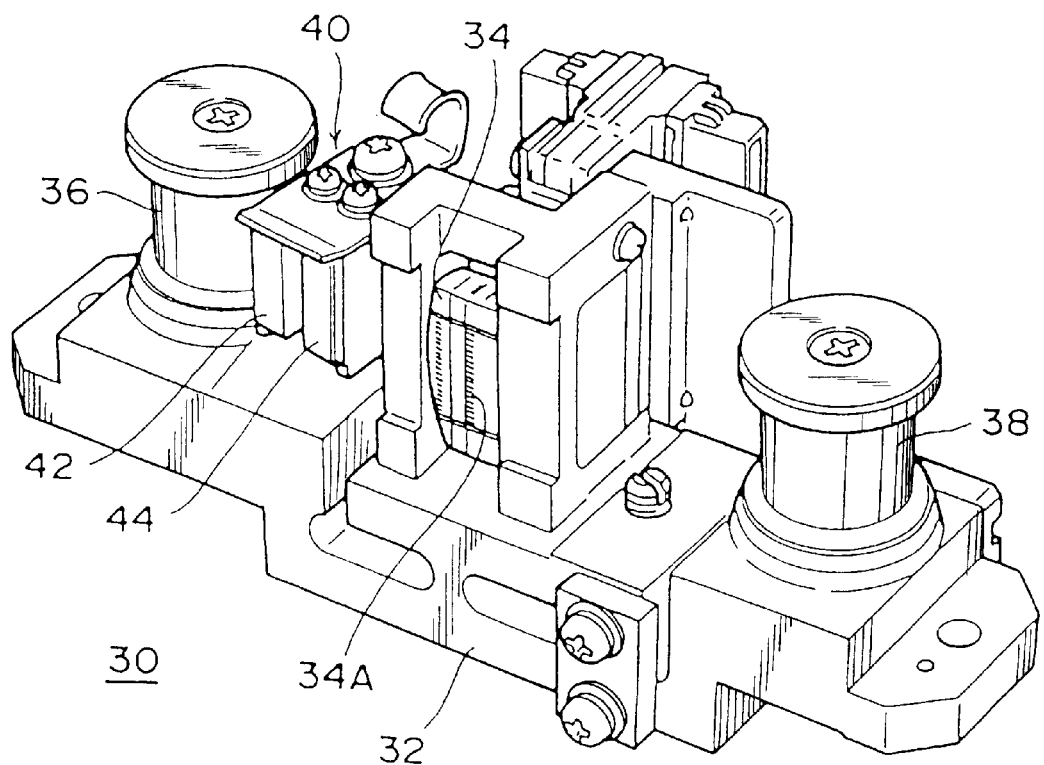
FIG. 4 is a perspective view of a head assembly.

FIG. 4 is a perspective view of the head assembly 30. A magnetic head 34 is fixed to a frame 32 at a substantially central portion thereof. A tape contact surface of the magnetic head 34 is formed with an air escaping groove 34A for maintaining a good contact condition between the magnetic tape and the tape contact surface. A pair of roller guides 36 and 38 are rotatably provided on the frame 32 on the opposite sides of the magnetic head 34 so as to be driven by the travel of the magnetic tape. Further, a tape cleaner 40 is provided between the roller guide 36 and the magnetic head 34. The tape cleaner 40 has two edges 42 and 44 formed of hard metal or the like. During traveling of the magnetic tape, the two edges 42 and 44 come to contact with the magnetic tape at an extremely shallow angle, thereby scraping off dirt sticking to the magnetic tape.

Figure 5:
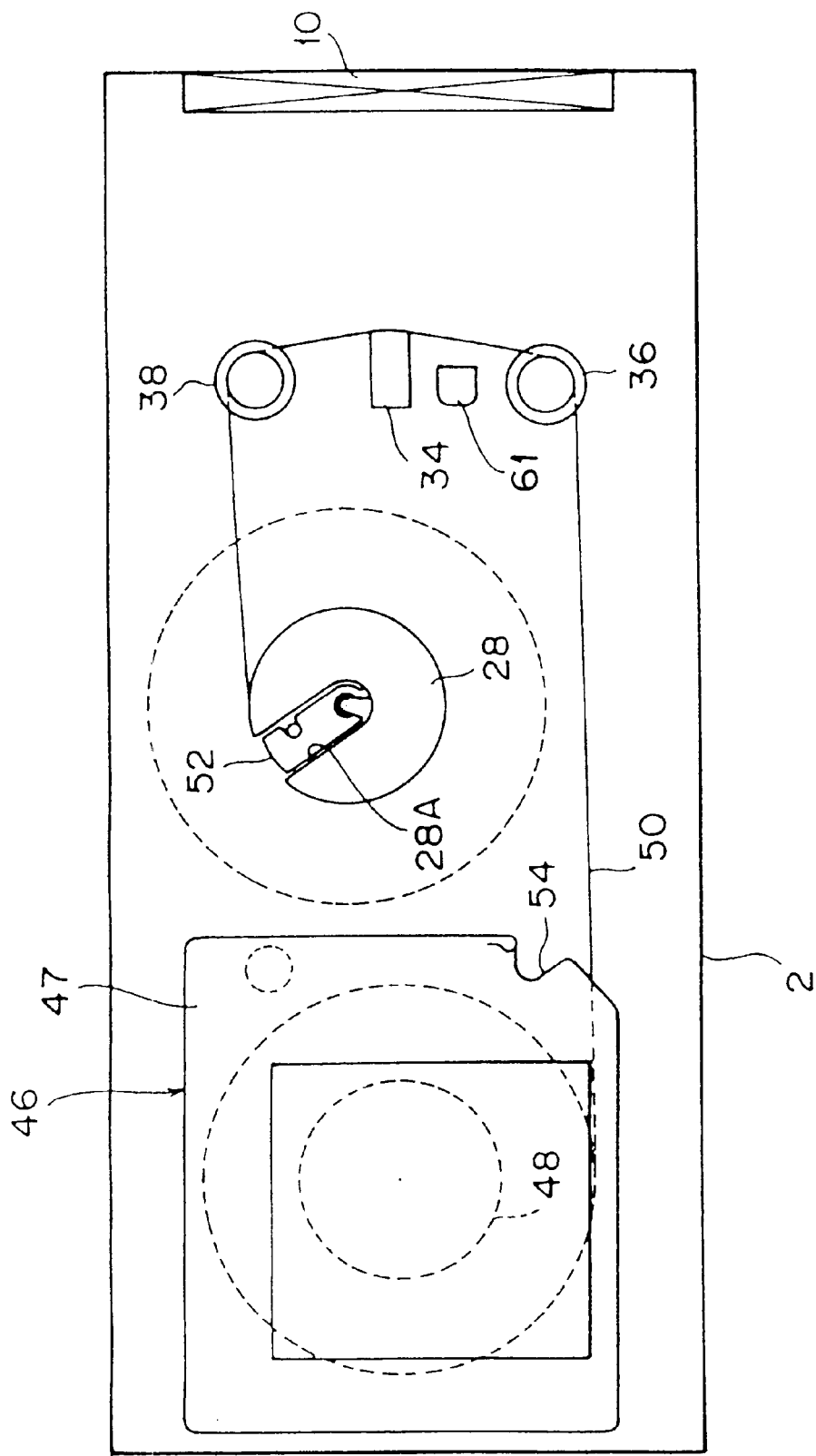
FIG. 5 is a plan view of an essential part of the magnetic tape drive unit.
Figure 6:
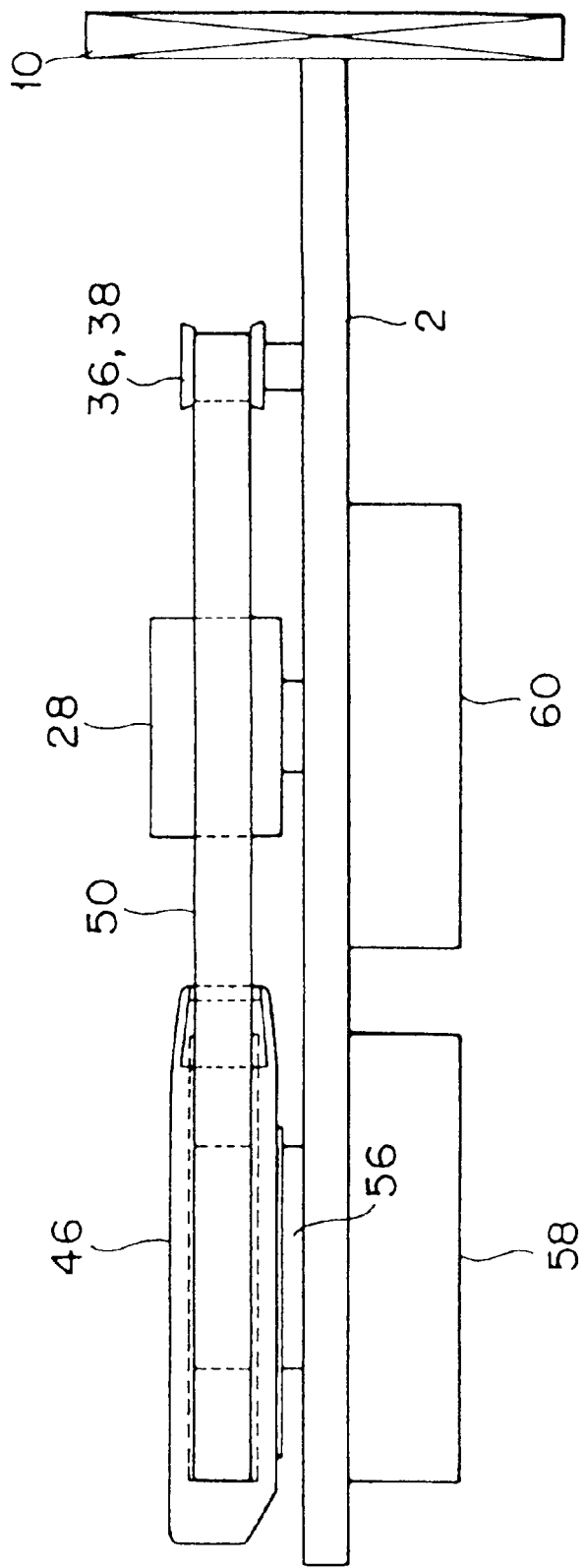
FIG. 6 is a side view of the essential part shown in FIG. 5.

FIG. 5 is a plan view of an essential part of the magnetic tape drive unit in this preferred embodiment, and FIG. 6 is a side view of the essential part shown in FIG. 5. Reference numeral 46 denotes a magnetic tape cartridge loaded to be set in a predetermined position inside the drive unit by the loader assembly 18 (see FIG. 3). The cartridge 46 is composed of a cartridge case 47, a hub 48 provided in the cartridge case 47, and a magnetic tape 50 having one end formed on the hub 48 and the other end on which a leader block 52 is mounted. In the condition where the magnetic tape 50 is fully wound around the hub 48, the leader block 52 is seated in a recess 54 formed at one of the four corners of the cartridge case 47. FIG. 5 shows another condition where the leader block 52 is guided by the pin 22 of the threader assembly 20 (see FIG. 2) and is finally engaged into a recess 28A of the machine reel 28. The hub 48 is engaged with a file reel 56 (see FIG. 6), and the file reel 56 is driven by a file reel motor 58. On the other hand, the machine reel 28 is driven by a machine reel motor 60 which is controlled to be driven independently of the file reel motor 58.

The operation of the threader assembly 20 will now be described with reference to FIGS. 2 to 5. When the magnetic tape cartridge 46 is set to the predetermined position by the loader assembly 18, the pin 22 located at the position shown in FIG. 2 comes into engagement with the leader block 52 seated in the recess 54 of the cartridge case 47. When the pin 22 is moved along the groove 24 by driving means not shown, the leading end (the leader block 52) of the magnetic tape 50 is accordingly guided along the roller guide 36, the magnetic head 34, and the roller guide 38, and is finally brought into engagement with the recess 28A of the machine reel 28. At this time, the pin 22 comes to the center of rotation of the machine reel 28, so that the pin 22 does not interfere with the rotation of the machine reel 28 during traveling of the magnetic tape 50. In rewinding the magnetic tape 50 around the hub 48 into the cartridge case 47, an unthread operation reverse to the above thread operation is performed. In both the thread operation and the unthread operation, the file reel motor 58 and the machine reel motor 60 are independently controlled to be driven, thereby suitably controlling a traveling speed, tension, etc. of the magnetic tape 50. The drive control of the motors can be performed by an ordinary circuit using a microcomputer or the like, so that the description thereof will be omitted herein.

In FIG. 5, reference numeral 61 denotes a temperature sensor for detecting a temperature inside the drive unit. In this preferred embodiment, the temperature sensor 61 is located in the vicinity of the magnetic head 34. Further, in this preferred embodiment, the cooling fan 10 shown in FIG. 1 is controlled to be driven according to the temperature detected by the temperature sensor 61 and an operating condition of each circuit to be hereinafter described. A manner of the drive control of the cooling fan 10 will be hereinafter described.

Figure 7:
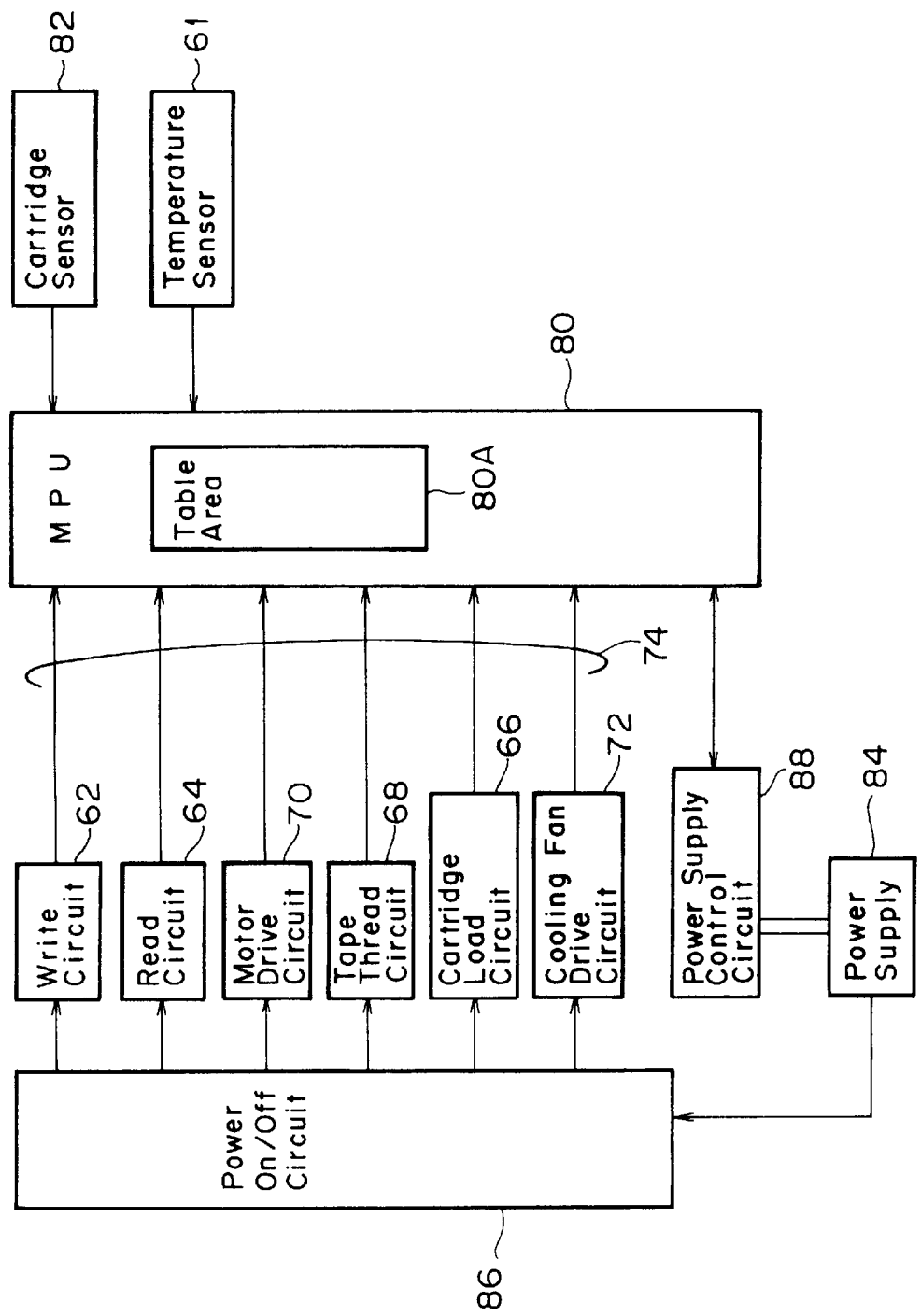
FIG. 7 is a block diagram of hardware according to a characterizing part of the present invention.

FIG. 7 is a block diagram showing a basic configuration of hardware according to a characterizing part of the present invention. A write circuit 62 modulates given data and then writes them through the magnetic head 34 (see FIG. 4, for example) onto the magnetic tape 50. A read circuit 64 reads contents written on the magnetic tape 50 by means of the magnetic head 34 and then demodulates them. A cartridge load circuit 66 controls a load operation such that the magnetic tape cartridge 46 inserted from the insert opening 14 (see FIG. 2) into the drive unit by an operator is moved to the predetermined position where the hub 48 of the magnetic tape cartridge 46 is rotatable, and also controls an unload operation reverse to the above load operation. A tape thread circuit 68 controls a thread operation such that the magnetic tape 50 is drawn from the magnetic tape cartridge 46 loaded to the above predetermined position and is then wound around the machine reel 28, and also controls an unthread operation reverse to the above thread operation. A motor drive circuit 70 drives a motor for performing the load operation and the unload operation, and other motors. A cooling fan drive circuit 72 controls to drive the cooling fan 10 shown in FIG. 1.

Operating condition signals 74 from all the above circuits are input into a drive unit control circuit 80 employing an MPU (Microprocessor Unit). Signals from a cartridge sensor 82 and the temperature sensor 61 are also input into the drive unit control circuit 80. The drive unit control circuit 80 has a table area 80A for storing an operating condition of each circuit. At each address of the table area 80A, the contents as shown in FIG. 8, for example, are stored. In this example shown in FIG. 8, a write circuit operating condition, read circuit operating condition, motor drive circuit operating condition, tape thread circuit operating condition, cartridge load circuit operating condition, and cooling fan drive circuit operating condition are stored at addresses 0 to 5, respectively.

A power supply 84 supplies power to the write circuit 62, the read circuit 64, the motor drive circuit 70, the tape thread circuit 68, the cartridge load circuit 66, and the cooling fan drive circuit 72. A power on/off circuit 86 switches on or off the supply of power from the power supply 84 to each circuit individually. A power supply control circuit 88 performs data transfer to and from the drive unit control circuit 80, and monitors the operating condition of each circuit to control the power on/off circuit 86 according to whether the supply of power to each circuit is required or not. More specifically, as to the write circuit 62, for example, the drive unit control circuit 80 always monitors the write circuit 62, and applies to the power supply control circuit 88 a power-off command of cutting off the supply of power to the write circuit 62 when a power-off condition of the write circuit 62 is satisfied. In receipt of the power-off command, the power supply control circuit 88 outputs to the power on/off circuit 86 a signal of cutting off the supply of power to the write circuit 62.

Now, the operation of the preferred embodiment according to the present invention will be described in more detail.

Figure 9:
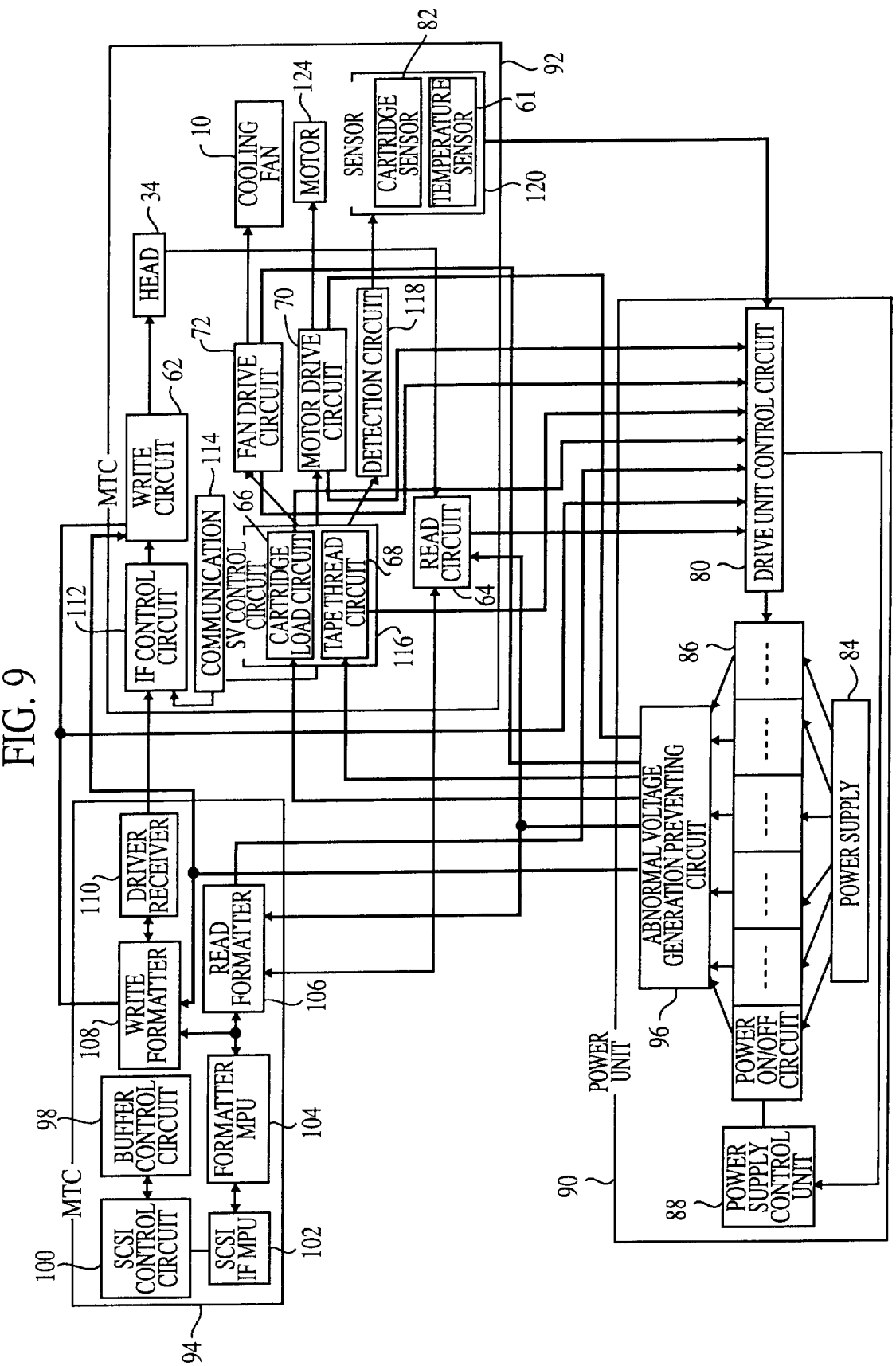
FIG. 9 is a block diagram of hardware showing a specific embodiment of the present invention shown in FIG. 7.

FIG. 9 is a block diagram showing a specific embodiment of the hardware shown in FIG. 7. The circuit configuration of the magnetic tape drive unit shown in FIG. 9 includes a power unit 90, a magnetic tape unit (MTU) 92, and a magnetic tape controller (MTC) 94. The power unit 90 includes the power supply 84, the power on/off circuit 86, the power supply control circuit 88, and the drive unit control circuit 80 which are also shown in FIG. 7, and further includes an abnormal voltage generation preventing circuit 96 for preventing application of abnormal voltage from the power on/off circuit 86 to each circuit. The MTC 94 includes a buffer control circuit 98, SCSI control circuit 100, SCSI (IF) MPU 102, format MPU 104, read formatter 106, write formatter 108, and driver receiver 110 in this order from a host circuit. The MTU 92 includes an IF control circuit 112, write circuit 62, magnetic head 34, communication circuit 114, SV control circuit 116, fan drive circuit 72, motor drive circuit 70, detection circuit 118, read circuit 64, cooling fan 10, motor 124, and sensor 120.

The SV control circuit 116 is composed of the cartridge load circuit 66 and the tape thread circuit 68, and the sensor 120 is composed of the cartridge sensor 82 and the temperature sensor 61.

The write formatter 108 feeds a write command through the driver receiver 110 and the IF control circuit 112 to the write circuit 62. The read formatter 106 feeds a read command to the read circuit 64. The operating conditions of the read formatter 106, the read circuit 64, the write formatter 108, the write circuit 62, the tape thread circuit 68, the cartridge load circuit 66, the fan drive circuit 72, and the motor drive circuit 70 are always monitored by the drive unit control circuit 80. Further, the supply of power to each circuit is controlled by the power supply control circuit 88 according to the operating condition of each circuit.

Figure 10:
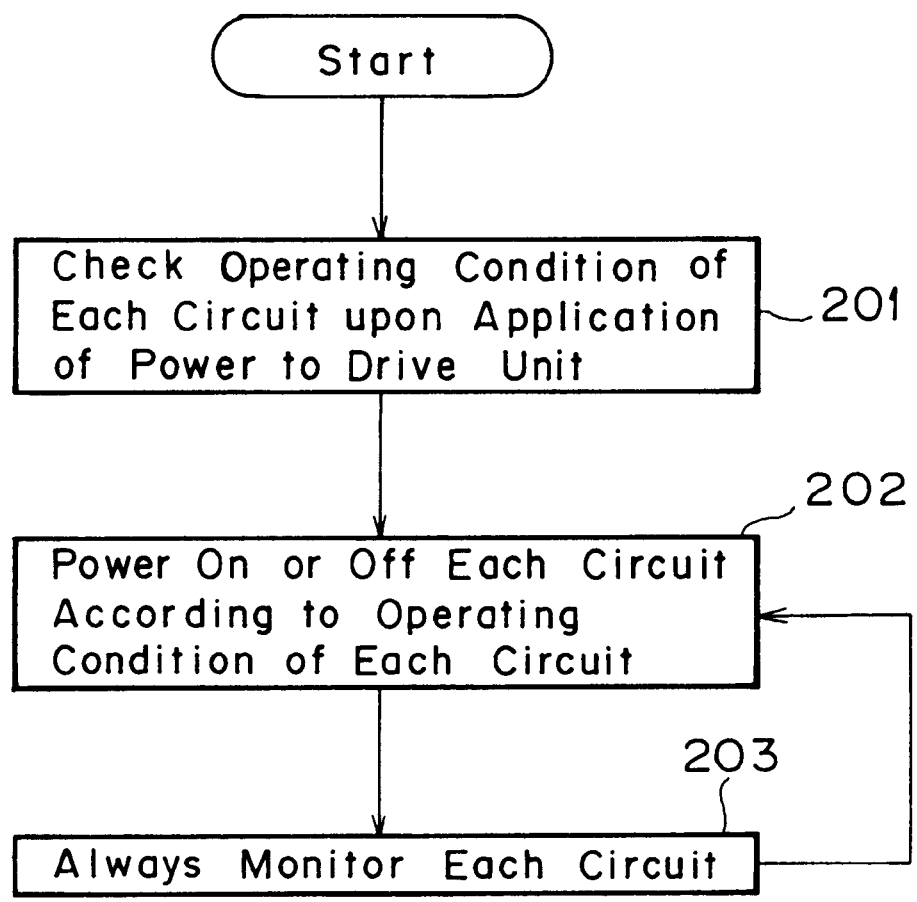
FIG. 10 is a flowchart showing a basic operation in the preferred embodiment of the present invention.

FIG. 10 is a flowchart showing a basic operation in this preferred embodiment. In step 201, the operating condition of each circuit is checked by the drive unit control circuit 80 upon application of power to the drive unit. In step 202, the supply of power from the power supply 84 to each circuit is switched on or off according to the operating condition of each circuit by the power supply control circuit 88 and the power on/off circuit 86. In step 203, the operating condition of each circuit is monitored by the drive unit control circuit 80. The routine of step 202 and step 203 is continued until the drive unit is powered off.

In this preferred embodiment, the write formatter 108 for feeding a write command to the write circuit 62 is provided. When the write circuit 62 receives a write command from the write formatter 108, the power supply control circuit 88 controls the power on/off circuit 86 to switch on the supply of power from the power supply 84 to the write circuit 62. After ending the write operation according to the write command, when the write circuit 62 receives no next write command during a predetermined time, the supply of power from the power supply 84 to the write circuit 62 is switched off. This process will be described below more specifically.

Figure 11:
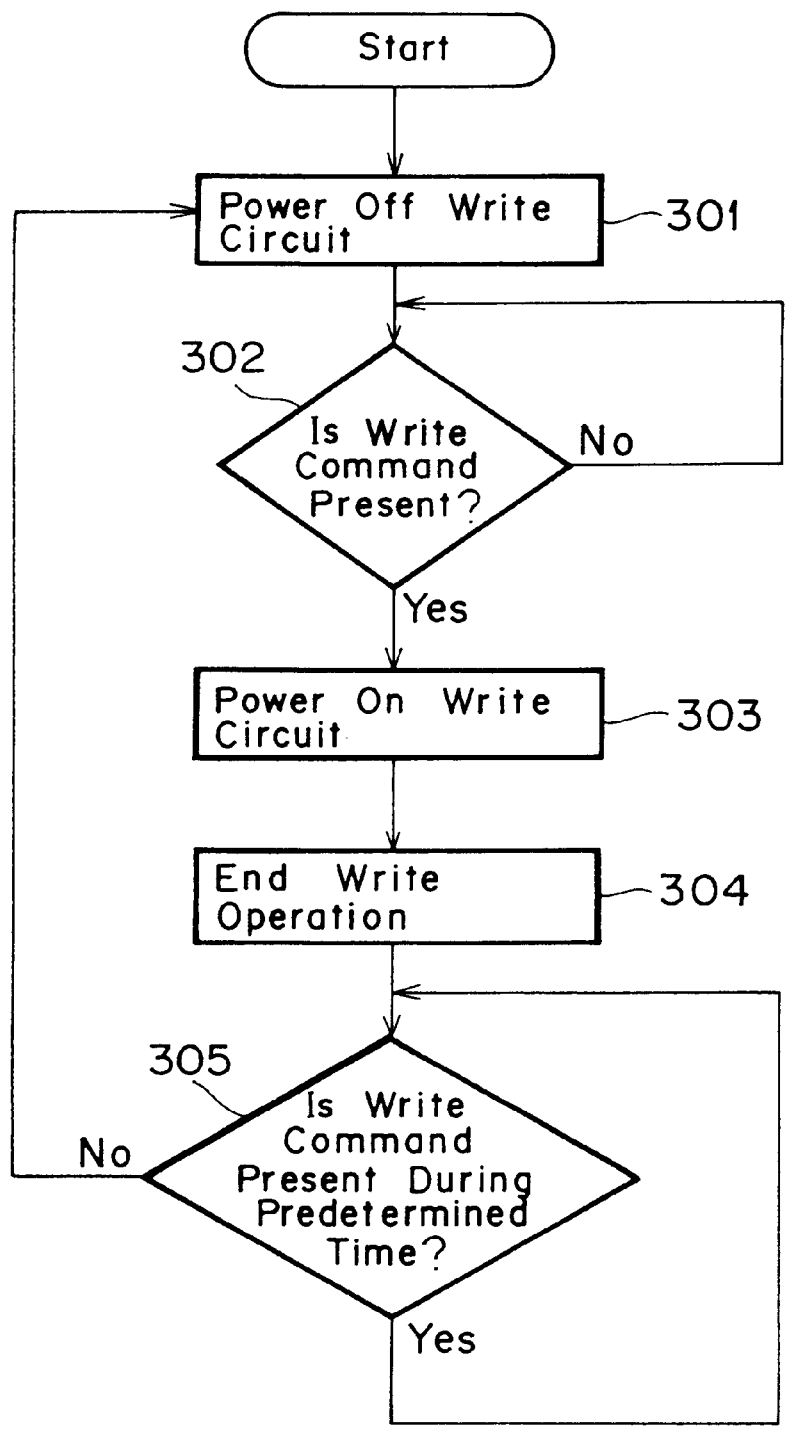
FIG. 11 is a flowchart showing the process for a write circuit.

FIG. 11 is a flowchart showing the process for the write circuit 62. In step 301, the supply of power to the write circuit 62 is switched off. In step 302, it is determined whether or not a write command is present. This determination step is periodically repeated until the write circuit 62 receives the write command. If the determination in step 302 is that the write command is present, the program proceeds to step 303, in which the supply of power to the write circuit 62 is switched on. When the write operation is ended in step 304, it is determined in step 305 whether or not the write circuit 62 receives the next write command during a predetermined time after ending the write operation. If the next write command is present, the determination in step 305 is periodically repeated to continue a waiting condition. If the next write command is not present, the program returns to step 301.

While the flowchart of FIG. 11 shows only the on/off control of the supply of power to the write circuit 62, the on/off control of the supply of power to the write formatter 108 can also be performed similarly. According to this flow, minimum power to be required is supplied to the write circuit 62 and the write formatter 108, thereby allowing power saving.

On the other hand, regarding a read operation, the read formatter 106 for feeding a read command to the read circuit 64 is provided. When the read circuit 64 receives a read command from the read formatter 106, the power supply control circuit 88 controls the power on/off circuit 86 to switch on the supply of power from the power supply 84 to the read circuit 64. After ending the read operation according to the read command, when the read circuit 64 receives no next write command during a predetermined time, the supply of power from the power supply 84 to the read circuit 64 is switched off. This process will be described below more specifically.

Figure 12:
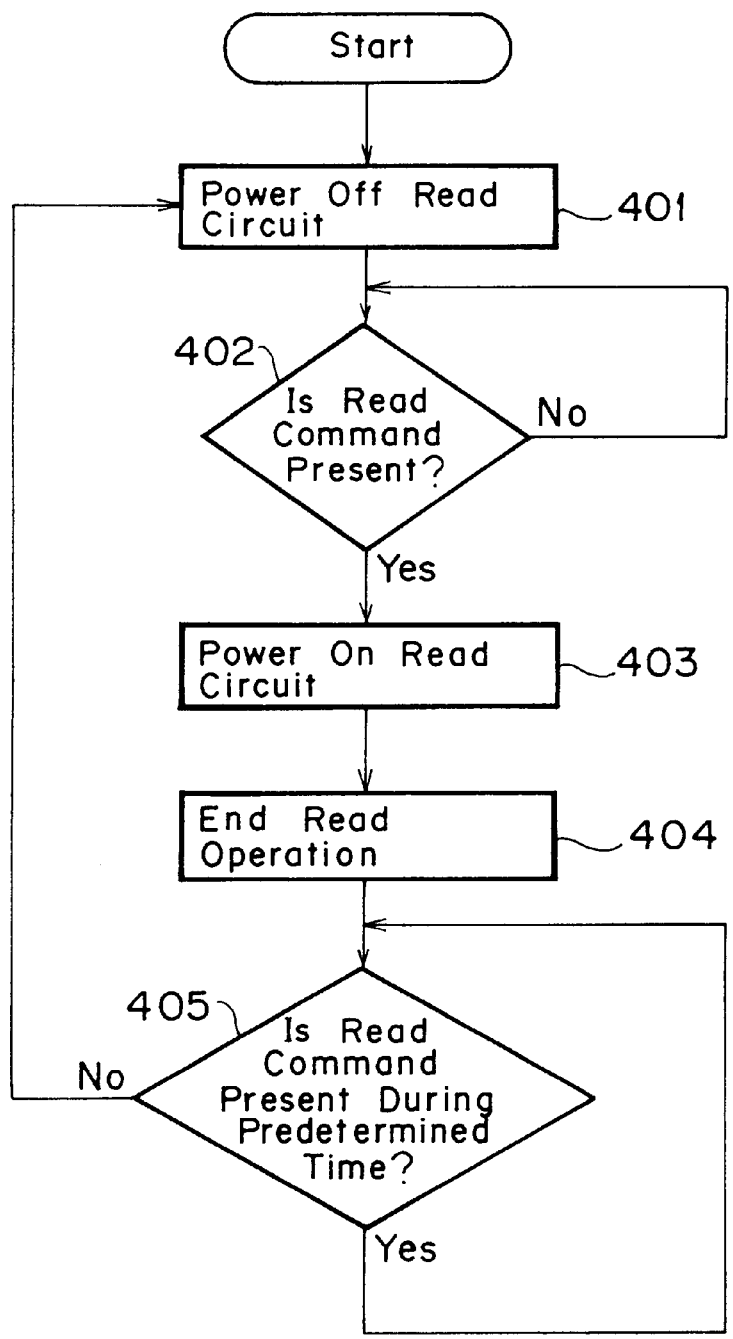
FIG. 12 is a flowchart showing the process for a read circuit.

FIG. 12 is a flowchart showing the process for the read circuit 64. In step 401, the supply of power to the read circuit 64 is switched off. In step 402, it is determined whether or not a read command is present. This determination step is periodically repeated until the read circuit 64 receives the read command. If the determination in step 402 is that the read command is present, the program proceeds to step 403, in which the supply of power to the read circuit 64 is switched on. When the read operation is ended in step 404, it is determined in step 405 whether or not the read circuit 64 receives the next read command during a predetermined time after ending the read operation. If the next read command is present, the determination in step 405 is periodically repeated to continue a waiting condition. If the next read command is not present, the program returns to step 401.

While the flowchart of FIG. 12 shows only the on/off control of the supply of power to the read circuit 64, the on/off control of the supply of power to the read formatter 106 can also be performed similarly. According to this flow, minimum power to be required is supplied to the read circuit 64 and the read formatter 106, thereby allowing power saving.

FIGS. 13 to 16 are a flowchart showing the process for a drive system. The drive system includes the cartridge load circuit 66, the tape thread circuit 68, and the motor drive circuit 70. In the initial condition of step 501, the supply of power to each circuit remains off. In step 502, it is determined whether or not the cartridge sensor 82 is on, that is, whether or not the magnetic tape cartridge has been inserted from the insert opening 14 (see FIG. 3) into the drive unit. This determination step is periodically repeated until the cartridge sensor 82 becomes on. If the determination in step 502 is that the cartridge sensor 82 is on, the program proceeds to steps 503, 504, and 505, in which the supply of power to the cartridge load circuit 66, the tape thread circuit 68, and the tape drive circuit 70 is simultaneously switched on.

Figure 14:
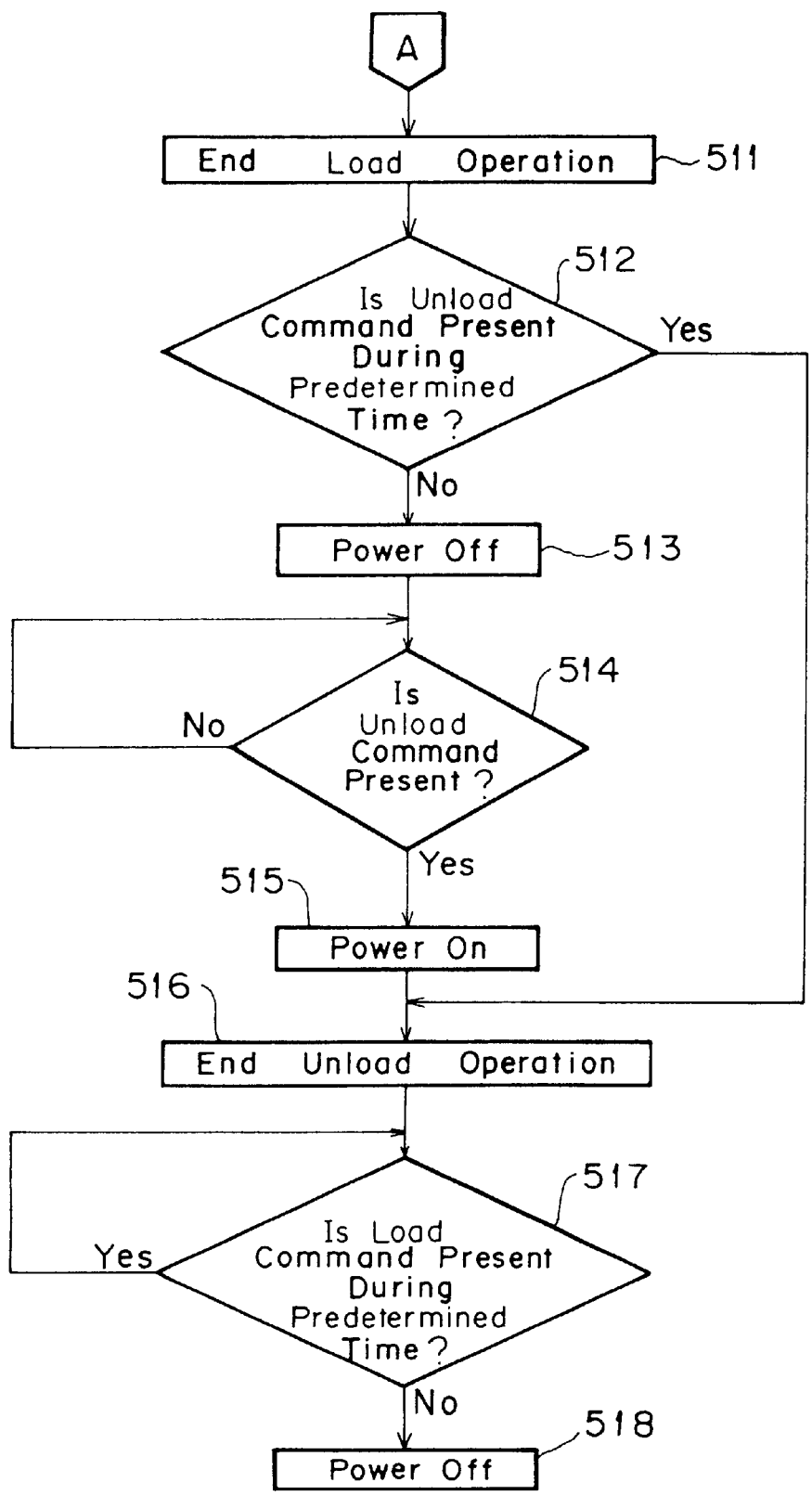

When the cartridge load circuit 66 is powered on in step 503, the program proceeds to step 511 shown in FIG. 14. When the load operation is ended in step 511, the program proceeds to step 512, in which it is determined whether or not an unload command is present during a predetermined time after ending the load operation. If the determination in step 512 is that the unload command is not present, the program proceeds to step 513, in which the supply of power to the cartridge load circuit 66 is switched off. Then, the program proceeds to step 514, in which it is determined whether or not an unload command is present. This determination step is periodically repeated until the unload command is received by the cartridge load circuit 66. If the determination in step 514 is that the unload command is present, the program proceeds to step 515, in which the supply of power to the cartridge load circuit 66 is switched on again. When the unload operation is ended in step 516, the program proceeds to step 517, in which it is determined whether or not the next load command is present during a predetermined time after ending the unload operation. This determination step is periodically repeated until no next load command is received. On the other hand, if the determination in step 512 is that the unload command is present, the program jumps to step 516 and then proceeds to step 517. If the determination in step 517 is that the next load command is not present, the program proceeds to step 518, in which the supply of power to the cartridge load circuit 66 is switched off.

Figure 13:
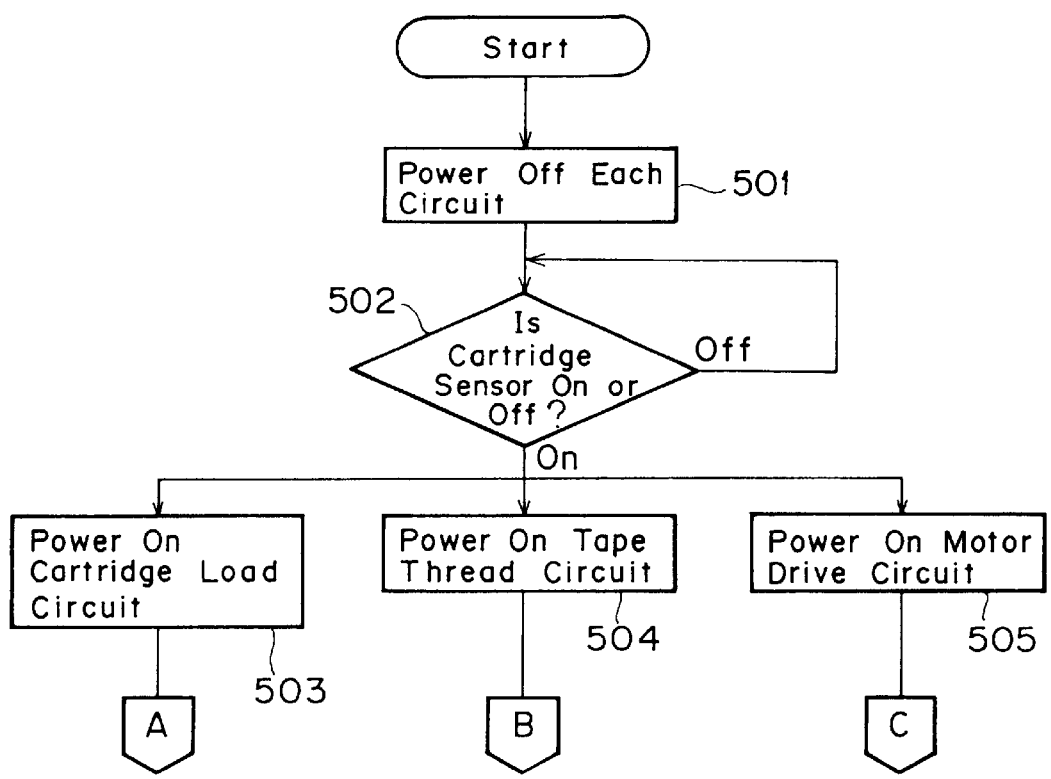
FIGS. 13 to 16 are a flowchart showing the process for a drive system.
Figure 15:
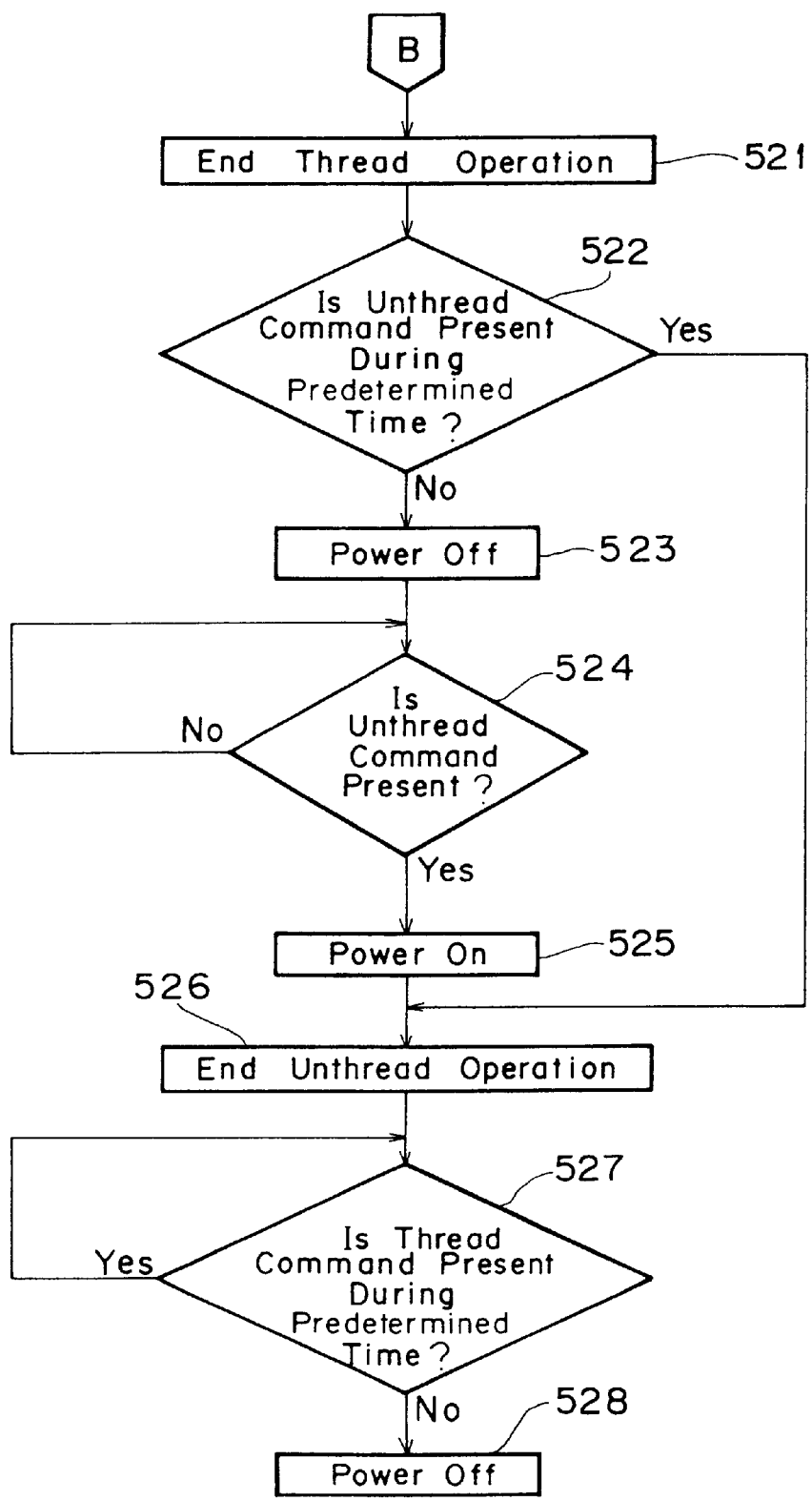

When the tape thread circuit 68 is powered on in step 504 shown in FIG. 13, the program proceeds to step 521 shown in FIG. 15. When the thread operation is ended in step 521, the program proceeds to step 522, in which it is determined whether or not an unthread command is present during a predetermined time after ending the thread operation. If the determination in step 522 is that the unthread command is not present, the program proceeds to step 523, in which the supply of power to the tape thread circuit 68 is switched off. Then, the program proceeds to step 524, in which it is determined whether or not an unthread command is present. This determination step is periodically repeated until the unthread command is received by the tape thread circuit 68. If the determination in step 524 is that the unthread command is present, the program proceeds to step 525, in which the supply of power to the tape thread circuit 68 is switched on again. When the unthread operation is ended in step 526, the program proceeds to step 527, in which it is determined whether or not the next thread command is present during a predetermined time after ending the unthread operation. This determination step is periodically repeated until no next thread command is received. On the other hand, if the determination in step 522 is that the unthread command is present, the program jumps to step 526 and then proceeds to step 527. If the determination in step 527 is that the next thread command is not present, the program proceeds to step 528, in which the supply of power to the tape thread circuit 68 is switched off.

Figure 16:
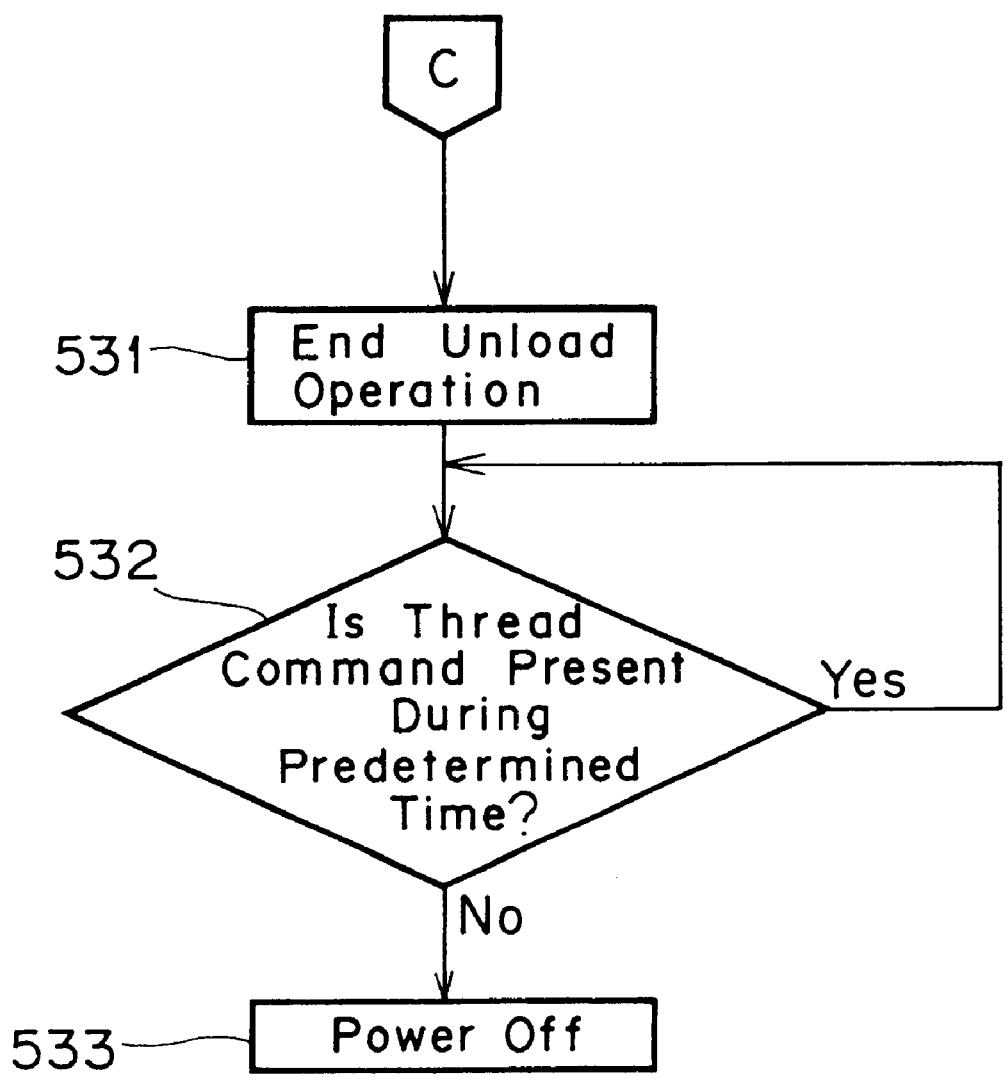

After the motor drive circuit 70 is powered on in step 505 shown in FIG. 13, the program proceeds to step 531 shown in FIG. 16. When the unload operation of the magnetic tape cartridge is ended in step 531, the program proceeds to step 532, in which it is determined whether or not the next load command is present during a predetermined time after ending the unload operation. This determination step is periodically repeated until no next load command is received. If the determination in step 532 is that the next load command is not present, the program proceeds to step 533, in which the supply of power to the motor drive circuit 70 is switched off. According to the flow shown in FIGS. 13 to 16, minimum power to be required is supplied to the drive system, thereby allowing power saving.

Figure 17:
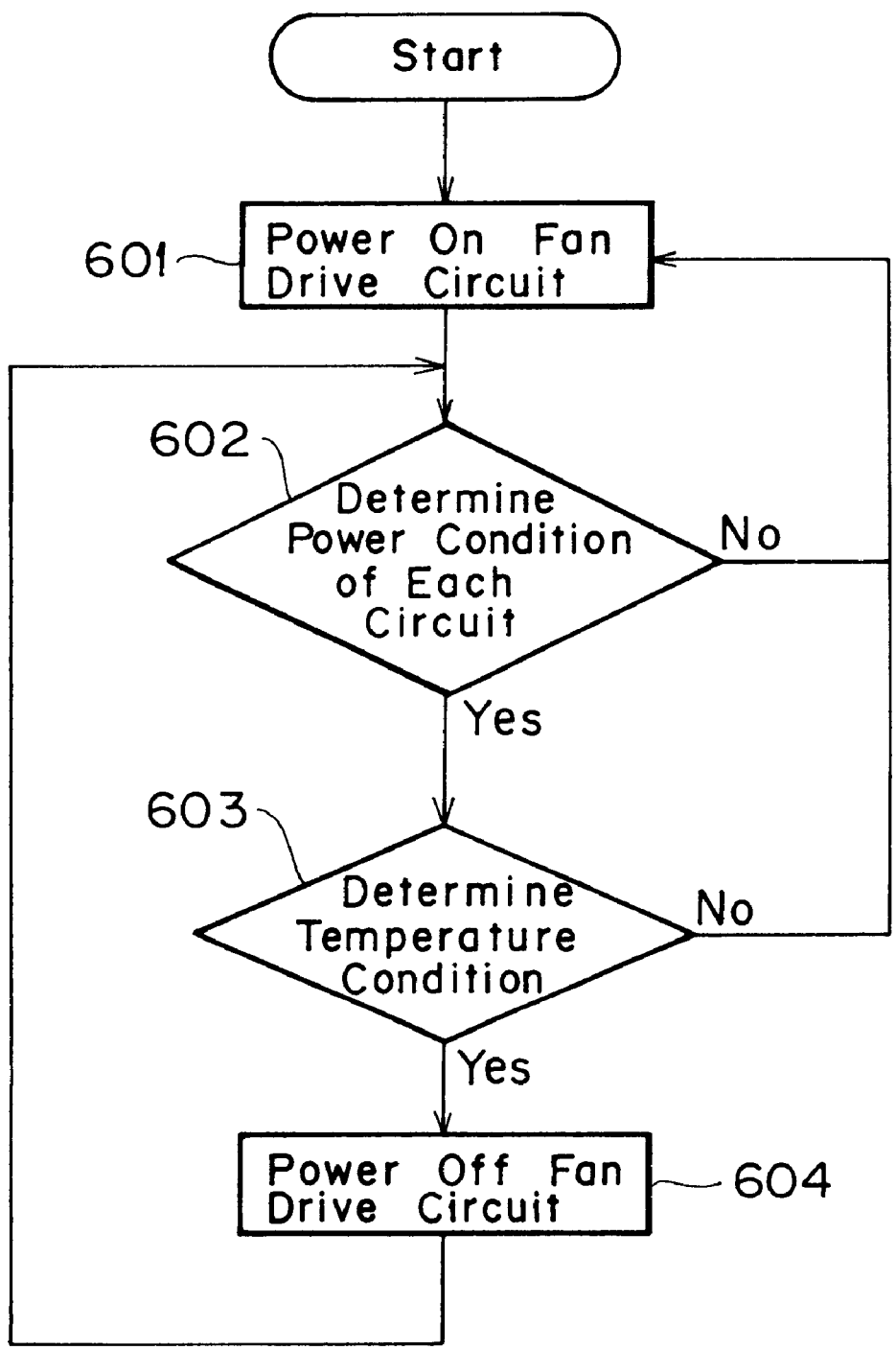
FIG. 17 is a flowchart showing the process for a fan drive circuit.

FIG. 17 is a flowchart showing the on/off process for the fan drive circuit 72. In step 601, the supply of power to the fan drive circuit 72 is switched on upon application of power to the drive unit. In step 602, it is determined whether or not a cumulative value of operating power of all the circuits in the MTU 92 and the MTC 94 is smaller than a predetermined value. If the cumulative value is smaller than the predetermined value, the program proceeds to step 603, whereas if the former is larger than the latter, the program returns to step 601. In step 603, it is determined whether or not a temperature inside the drive unit detected by the temperature sensor 61 is lower than a predetermined value. If the detected temperature is lower than the predetermined value, the program proceeds to step 604, whereas if the former is higher than the latter, the program returns to step 601. The case where the program proceeds to step 604 occurs when the temperature inside the drive unit is low and the operating power is also low. Accordingly, the supply of power to the fan drive circuit 72 is switched off in this case. Thereafter, the routine of steps 602, 603, and 604 is continued. According to this flow, the drive control of the cooling fan is performed according to the operating power of each circuit and the detected temperature inside the drive unit, thereby allowing power saving.

Although the control of all the circuits is performed by the MPU in the above preferred embodiment, the control of the fan drive circuit may be performed by hardware employing a logic circuit as the circuit for determining the conditions of fan drive by grasping power consumption of each circuit in the drive unit.

Further, although the operating condition of each circuit is monitored to switch on or off the supply of power to each circuit according to whether it is required or not in the above preferred embodiment, the operating condition of the drive unit itself may be monitored to switch on or off the supply of power to each circuit according to the operating condition of the drive unit.

That is, according to another aspect of the present invention, there is provided a magnetic tape drive unit comprising a write circuit for modulating given data and then writing them through a magnetic head onto a magnetic tape, a read circuit for reading contents written on the magnetic tape by means of the magnetic head and then demodulating the contents read, a power supply for supplying power to each circuit, power on/off means for switching on or off the supply of power from the power supply to each circuit individually, and power supply control means for monitoring an operating condition of the drive unit and controlling the power on/off means according to the operating condition of the drive unit. A specific embodiment of the magnetic tape drive unit according to this aspect of the present invention will now be described with reference to FIGS. 18 and 19.

Figure 18:
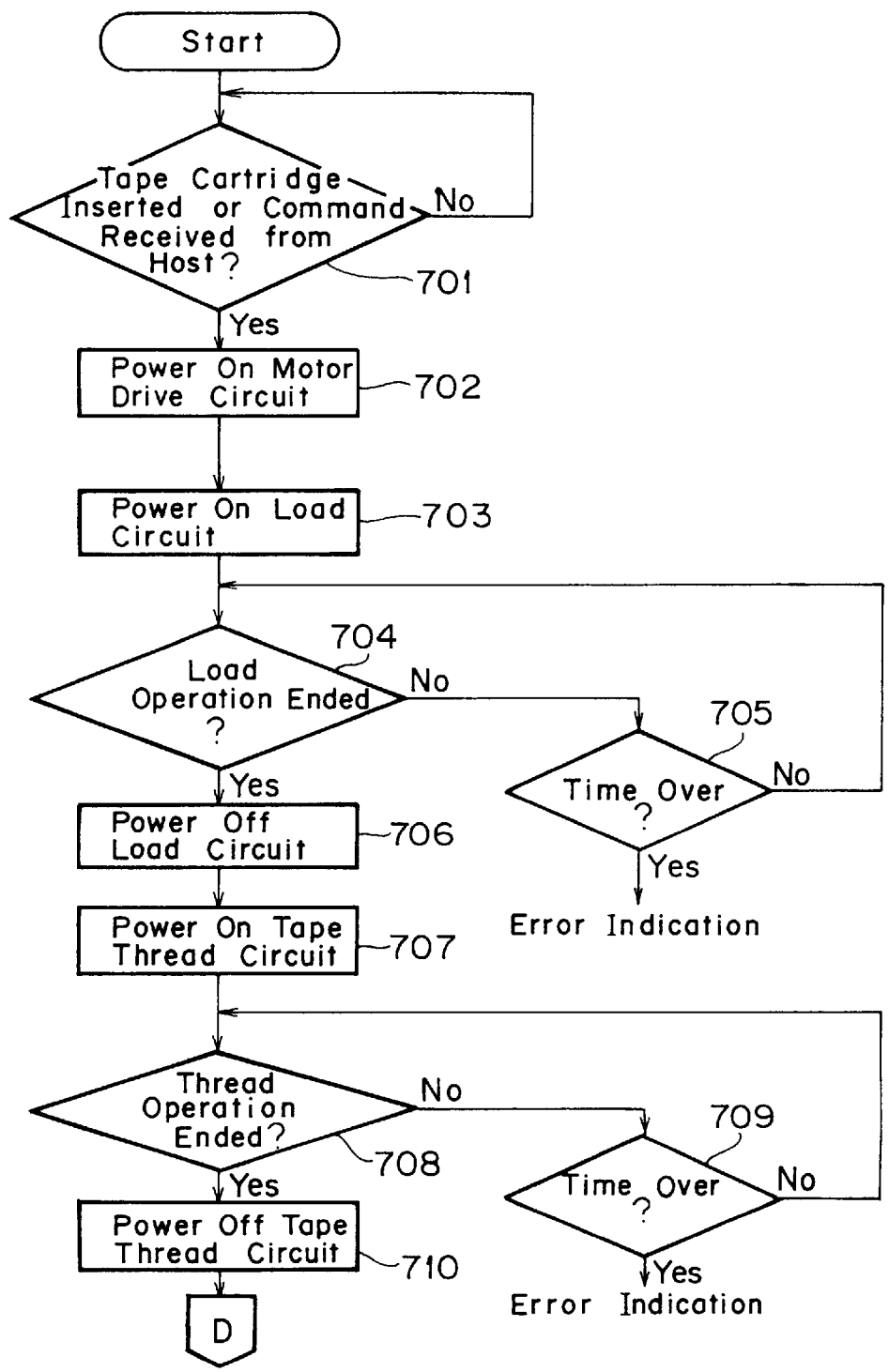
FIGS. 18 and 19 are a flowchart showing the operation in another preferred embodiment of the present invention.
Figure 19:
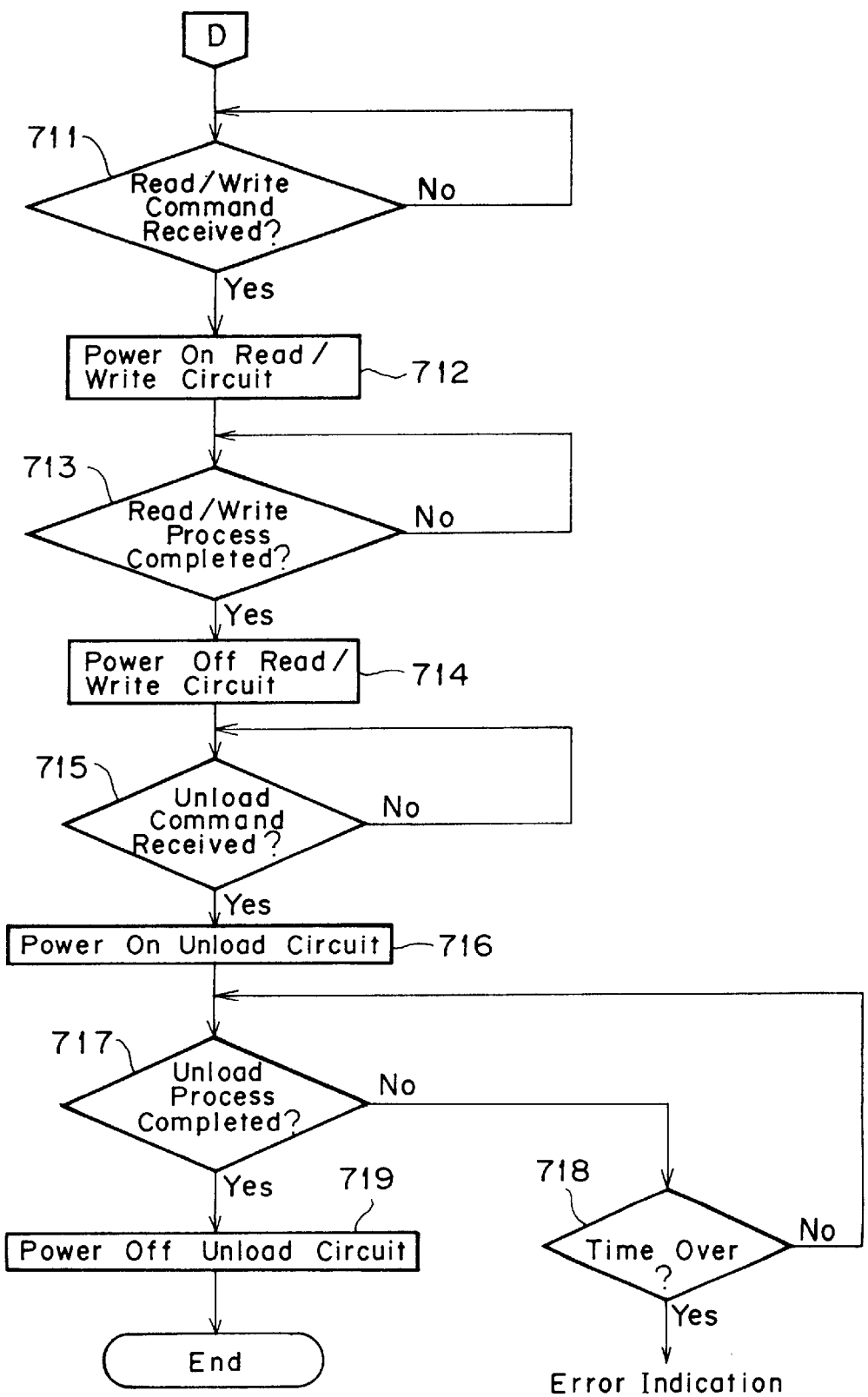

FIGS. 18 and 19 are a flowchart showing the operation of the specific embodiment as another preferred embodiment of the present invention. In step 701, it is determined whether or not a magnetic tape cartridge has been put into the drive unit, or a command has been received from a host computer. If the answer in step 701 is yes, the program proceeds to step 702, in which a motor drive circuit is powered on. In step 703, a load circuit is next powered on. In step 704, it is determined whether or not a load operation has been ended. If the load operation has not been ended, the program proceeds to step 705, in which it is determined whether or not an elapsed time for loading has exceeded a predetermined time. If the answer in step 705 is yes, error indication is made, whereas if the answer in step 705 is no, the program returns to step 704. If the load operation has been ended, the program proceeds to step 706, in which the load circuit is powered off. In step 707, a tape thread circuit is next powered on.

In step 708, it is determined whether or not a thread operation has been ended. If the thread operation has not been ended, the program proceeds to step 709, in which it is determined whether or not an elapsed time for threading has exceeded a predetermined time. If the answer in step 709 is yes, error indication is made, whereas if the answer in step 709 is no, the program returns to step 708. If the thread operation has been ended, the program proceeds to step 710, in which the tape thread circuit is powered off.

In step 711, it is determined whether or not a read/write command has been received. If the read/write command has been received, the program proceeds to step 712, in which a read/write circuit is powered on. In step 713, it is determined whether or not a read/write process has been completed. If the read/write process has been completed, the program proceeds to step 714, in which the read/write circuit is powered off. In step 715, it is determined whether or not an unload command has been received. If the unload command has been received, the program proceeds to step 716, in which an unload circuit is powered on.

In step 717, it is determined whether or not an unload process has been completed. If the unload process has not been completed, the program proceeds to step 718, in which an elapsed time for unloading has exceeded a predetermined time. If the answer in step 718 is yes, error indication is made, whereas if the answer in step 718 is no, the program returns to step 717. If the unload process has been completed, the program proceeds to step 719, in which the unload circuit is powered off. Then, this flow can be ended.

As described above, the present invention can exhibit an effect such that power consumption of the drive unit as a whole can be greatly reduced by maximizing the utilization of a merit owing to installation of a power supply in the drive unit for the purpose of reduction in size (e.g., a merit such that power supply control can be made finer).

What is claimed is:

1. A magnetic tape drive unit comprising:

a housing;

a write circuit in said housing for performing a writing operation, modulating given data and then writing said modulated data through a magnetic head onto a magnetic tape;

a read circuit in said housing for performing a reading operation, reading data written on said magnetic tape by said magnetic head and then demodulating said data;

a cartridge load circuit in said housing for controlling a load operation so that a magnetic tape cartridge put into said drive unit is moved to a position where a hub of said magnetic tape cartridge is rotatable, and also controlling an unload operation reverse to said load operation;

a tape thread circuit in said housing for controlling a thread operation so that said magnetic tape is drawn from said magnetic tape cartridge loaded and is then wound around a machine reel, and also controlling an unthread operation reverse to said thread operation;

a cooling fan for ventilating said drive unit;

a fan drive circuit for driving said cooling fan;

a power supply for supplying power to each of said circuits;

power on/off means for switching on or off a supply of power from said power supply to each of said circuits individually; and power supply control means for monitoring an operating condition of each of said circuits, determining which operations are being performed in accordance with received commands and controlling said power on/off means in accordance with said received commands such that the power is supplied to only said circuits which are required to carry out the determined operation;

wherein said power supply control means turns off said supply of power to said fan drive circuit after determining that a cumulative value of operating power of the circuits is below a predetermined value and a temperature inside the magnetic tape drive unit is below a predetermined temperature, and wherein after said power supply control means turns off said supply of power to said fan drive circuit, said power supply control means controls the supply of power from said power supply to said fan drive circuit to turn the fan on according to only a comparison of a cumulative value of operating power of the circuits in use to said predetermined value without the need to use any actual monitored temperature as a factor when said cumulative value of operating power is above said predetermined value.

2. A magnetic tape drive unit according to claim 1, further comprising means for feeding a write command;

wherein when said write circuit receives said write command, said power supply control means controls to switch on the supply of power from said power supply to said write circuit, whereas when said write circuit does not next receive said write command during a predetermined time after ending a write operation according to said write command, said power supply control means controls to switch off the supply of power from said power supply to said write circuit.

3. A magnetic tape drive unit according to claim 1, further comprising means for feeding a read command;

wherein when said read circuit receives said read command, said power supply control means controls to switch on the supply of power from said power supply to said read circuit, whereas when said read circuit does not next receive said read command during a predetermined time after ending a read operation according to said read command, said power supply control means controls to switch off the supply of power from said power supply to said read circuit.

4. A magnetic tape drive unit according to claim 1, further comprising:

a housing having a tape insert opening from which said magnetic tape cartridge is inserted into said housing;

a cartridge sensor for detecting that said magnetic tape cartridge has been inserted from said tape insert opening into said housing; and means for feeding a load command and an unload command to said cartridge load circuit;

wherein when said cartridge sensor detects insertion of said magnetic tape cartridge, and when said cartridge load circuit receives said unload command, said power supply control means controls to switch on the supply of power from said power supply to said cartridge load circuit, whereas when said cartridge load circuit does not next receive said unload command during a predetermined time after ending said load operation, and when said cartridge load circuit does not next receive said load command during a predetermined time after ending said unload operation, said power supply control means controls to switch off the supply of power from said power supply to said cartridge load circuit.

5. A magnetic tape drive unit according to claim 1, further comprising:

a housing having a tape insert opening from which said magnetic tape cartridge is inserted into said housing;

a cartridge sensor for detecting that said magnetic tape cartridge has been inserted from said tape insert opening into said housing; and means for feeding a thread command and an unthread command to said tape thread circuit;

wherein when said cartridge sensor detects insertion of said magnetic tape cartridge, and when said tape thread circuit receives said unthread command, said power supply control means controls to switch on the supply of power from said power supply to said tape thread circuit, whereas when said tape thread circuit does not next receive said unthread command during a predetermined time after ending said thread operation, and when said tape thread circuit does not next receive said thread command during a predetermined time after ending said unthread operation, said power supply control means controls to switch off the supply of power from said power supply to said tape thread circuit.

6. A magnetic tape drive unit according to claim 1, further comprising:

a housing having a tape insert opening from which said magnetic tape cartridge is inserted into said housing;

a cartridge sensor for detecting that said magnetic tape cartridge has been inserted from said tape insert opening into said housing;

a motor drive circuit for driving a motor for performing said load operation and said unload operation; and means for feeding a load command and an unload command to said motor drive circuit;

wherein said power supply further supplies power to said motor drive circuit;

said power on/off means further switches on or off the supply of power from said power supply to said motor drive circuit; and when said cartridge sensor detects insertion of said magnetic tape cartridge, said power supply control means controls to switch on the supply of power from said power supply to said motor drive circuit, whereas when said motor drive circuit does not receive said load command during a predetermined time after ending said unload operation, said power supply control means controls to switch off the supply of power from said power supply to said motor drive circuit.

7. A magnetic tape drive unit according to claim 1, further comprising an abnormal voltage generation preventing circuit for preventing application of abnormal voltage from said power on/off means to each of said circuits.

8. A magnetic tape drive unit according to claim 1, further comprising:

a temperature sensor for detecting a temperature inside said drive unit;

wherein said power supply control means controls the supply of power from said power supply to said fan drive circuit according to the temperature detected by said temperature sensor and a comparison of a total power consumed by the circuits in use to a predetermined value.

9. A magnetic tape drive unit comprising:

a housing;

a write circuit in said housing for modulating given data and then writing said data modulated through a magnetic head onto a magnetic tape;

a read circuit in said housing for reading contents written on said magnetic tape by means of said magnetic head and then demodulating said contents read;

a cooling fan for ventilating said drive unit; and a fan drive circuit for driving said cooling fan;

a power supply for supplying power to each of said circuits;

power on/off means for switching on or off supply of power from said power supply to each of said circuits individually; and power supply control means for monitoring an operating condition of each of said circuits and controlling said power on/off means in accordance with a received command and according to whether the supply of power to each of said circuits is required or not;

wherein said power supply control means turns off said supply of power to said fan drive circuit after determining that a cumulative value of operating power of the circuits is below a predetermined value and a temperature inside the magnetic tape drive unit is below a predetermined temperature, and wherein after said power supply control means turns off said supply of power to said fan drive circuit, said power supply control means controls the supply of power from said power supply to said fan drive circuit to turn the fan on according to only a comparison of a cumulative value of operating power of the circuits in use to said predetermined value without the need to use any actual monitored temperature as a factor when said cumulative value of operating power is above said predetermined value.

10. A magnetic tape drive unit comprising:

a housing;

a write circuit in said housing for modulating given data and then writing said data modulated through a magnetic head onto a magnetic tape;

a read circuit in said housing for reading contents written on said magnetic tape by means of said magnetic head and then demodulating said contents read;

a cooling fan for ventilating said drive unit; and a fan drive circuit for driving said cooling fan;

a power supply for supplying power to each of said circuits;

power on/off means for switching on or off supply of power from said power supply to each of said circuits individually; and power supply control means for monitoring an operating condition of said drive unit and controlling said power on/off means in accordance with a received command and according to the operating condition of said drive unit;

wherein said power supply control means turns off said supply of power to said fan drive circuit after determining that a cumulative value of operating power of the circuits is below a predetermined value and a temperature inside the magnetic tape drive unit is below a predetermined temperature, and wherein after said power supply control means turns off said supply of power to said fan drive circuit, said power supply control means controls the supply of power from said power supply to said fan drive circuit to turn the fan on according to only a comparison of a cumulative value of operating power of the circuits in use to said a predetermined value without the need to use any actual monitored temperature as a factor when said cumulative value of operating power is above said predetermined value.

* * * * *